W. B. STORY.
ASSEMBLING MACHINE.
APPLICATION FILED NOV. 16, 1916.

1,258,720.

Patented Mar. 12, 1918.
5 SHEETS—SHEET 1.

INVENTOR
Ward B Story
BY
ATTORNEY

W. B. STORY.
ASSEMBLING MACHINE.
APPLICATION FILED NOV. 16, 1916.
1,258,720.
Patented Mar. 12, 1918.
5 SHEETS—SHEET 4.
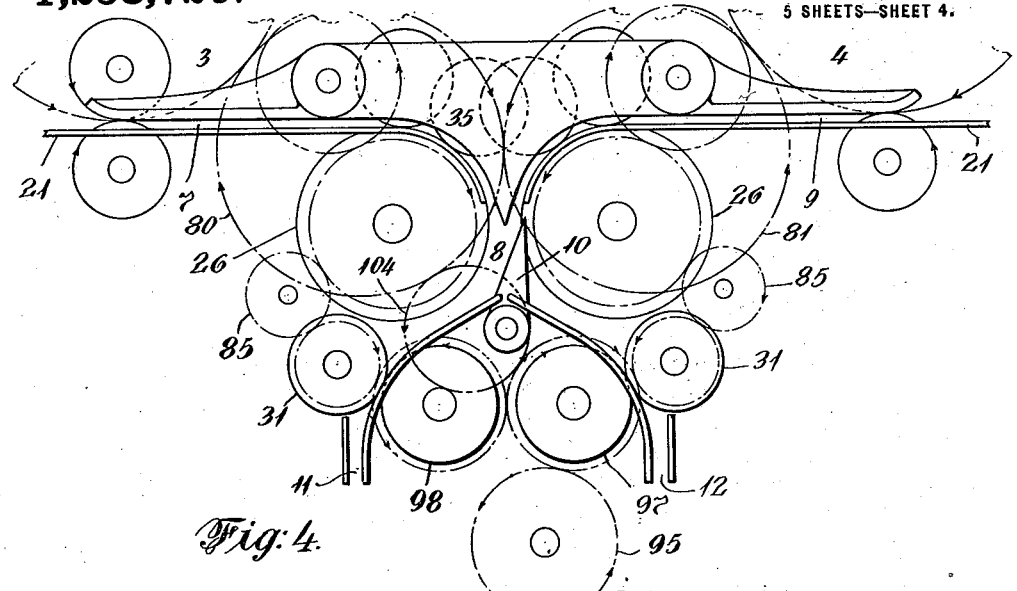
Fig. 4.
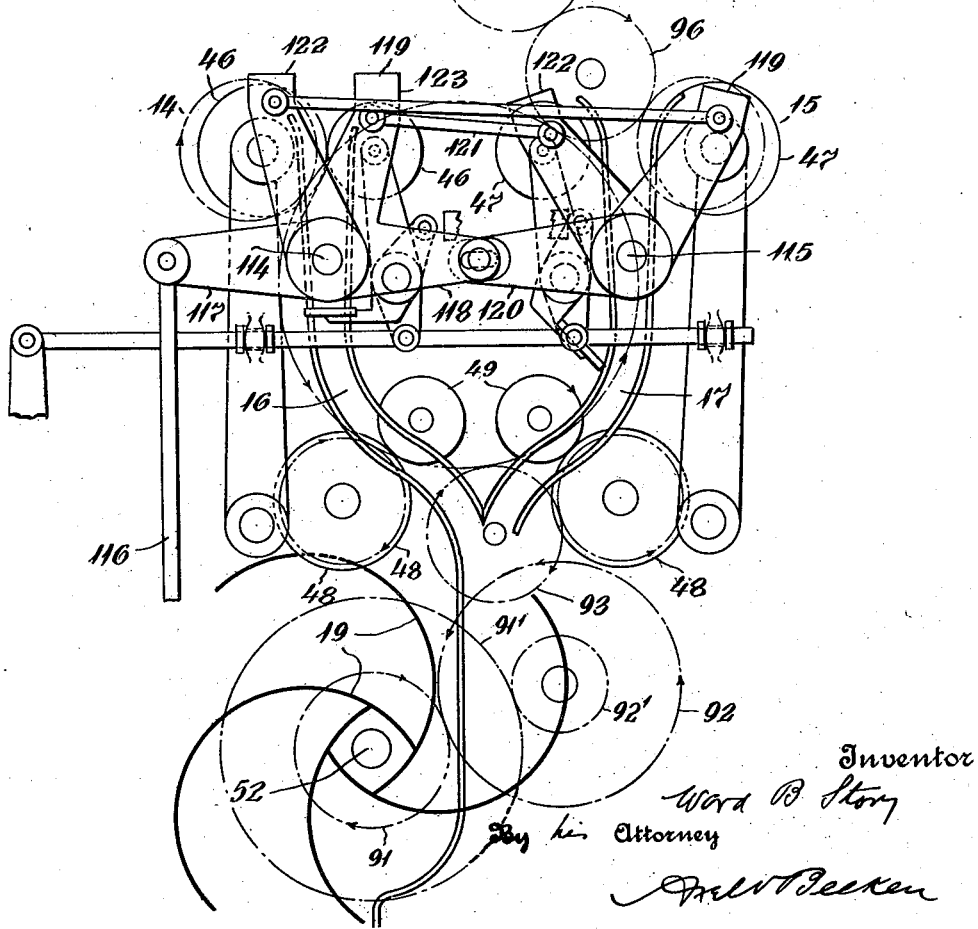
Inventor
Ward B. Story
By his Attorney W. B. STORY.
ASSEMBLING MACHINE.
APPLICATION FILED NOV. 16, 1916.
1,258,720.
Patented Mar. 12, 1918.
5 SHEETS—SHEET 5.
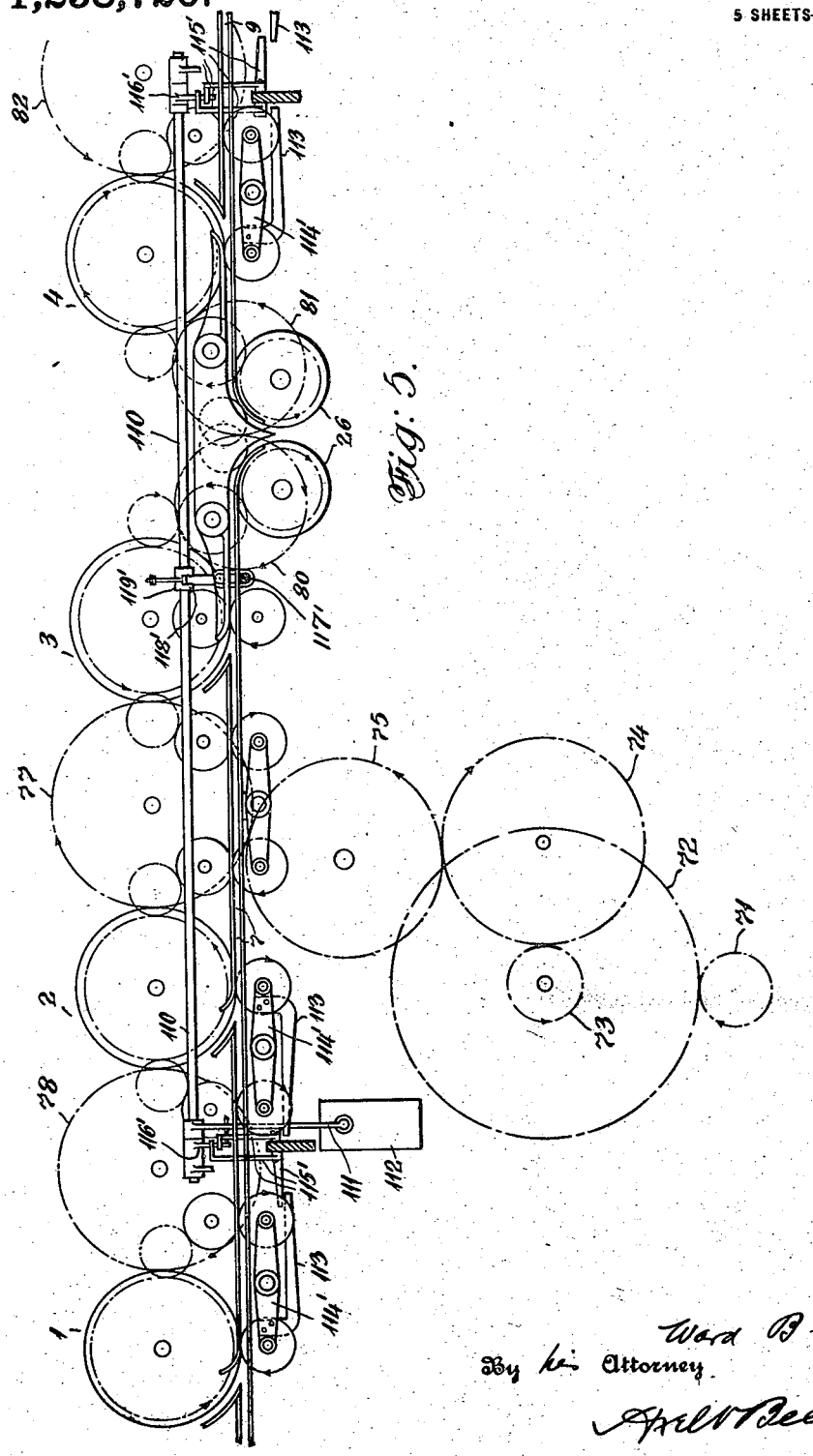

UNITED STATES PATENT OFFICE.

WARD B. STORY, OF NEW YORK, N. Y., ASSIGNOR TO AMERICAN ASSEMBLING MACHINE COMPANY, A CORPORATION OF DELAWARE.

ASSEMBLING-MACHINE.

1,258,720.  Specification of Letters Patent.  Patented Mar. 12, 1918.

Application filed November 16, 1916. Serial No. 131,674.

*To all whom it may concern:*

Be it known that I, WARD B. STORY, a citizen of the United States, and a resident of New York city, in the county of New York and State of New York, have invented certain new and useful Improvements in Assembling-Machines, of which the following is a specification.

This invention relates generally to assembling machines and is particularly designed for use in the art of assembling or "stuffing" newspapers.

The machines heretofore known and used for this purpose have invariably included a complex organization of mechanism that not only rendered them likely to get out of order at frequent intervals, but also decreased the speed of operation and prevented ready access to working parts for the purpose of removing obstructing material or making repairs. The main object of this invention is to produce an improved and simplified machine capable of operating at a greatly increased speed, and in which the operating parts are easily accessible.

With these objects generally in view the invention consists in such novel features of construction and combination of parts as are hereinafter described in the specification and set forth in the claims.

In the accompanying drawings the invention is disclosed in a concrete and preferred form, but it is to be understood that the invention may be carried out by other embodiments thereof and by mechanism widely different from that selected for illustration.

In the drawings, in which like reference characters are used to designate like parts throughout the several views, Figures 1 and 2 together show a side elevation of a machine embodying the invention.

Fig. 4 is a diagrammatic view of a part of the machine showing the opening and assembling devices.

Fig. 5 is a diagrammatic view showing means for automatically stopping the operation of the machine when the feeding devices feed an abnormal number of paper sections into the machine.

In the particular embodiment of the invention disclosed there is shown an assembling machine of the general type shown in the patent to Curry, No. 1,117,000, in which paper sections are fed from a plurality of hoppers mounted in the upper part of the machine to opening and stuffing mechanism in the body of the machine and thence to delivery mechanism at one end thereof. In the particular machine shown in this application, while the general arrangement of mechanism referred to has been employed, the general construction and arrangement of parts has been greatly simplified and the operating mechanism rendered more accessible.

Figure 1:
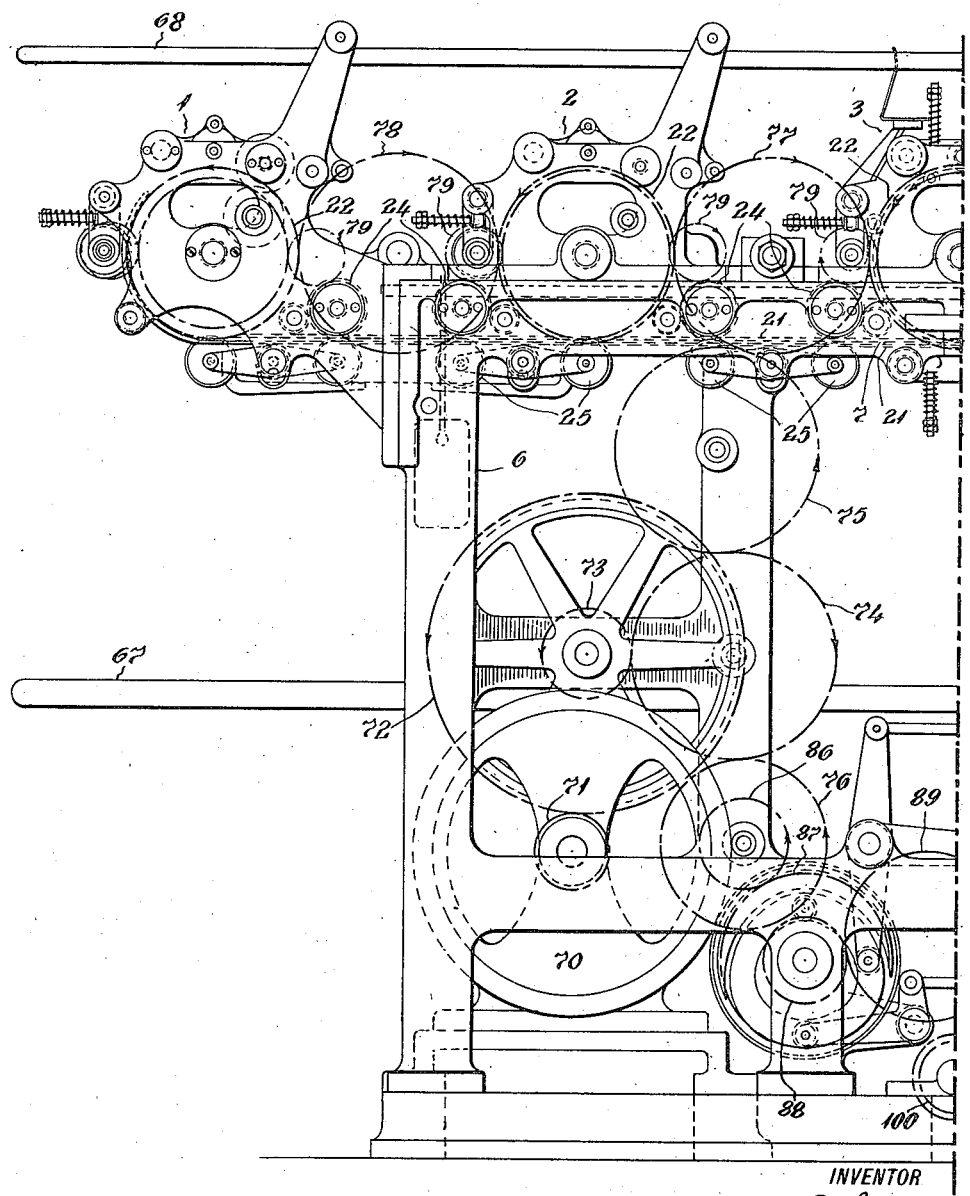
Figure 2:
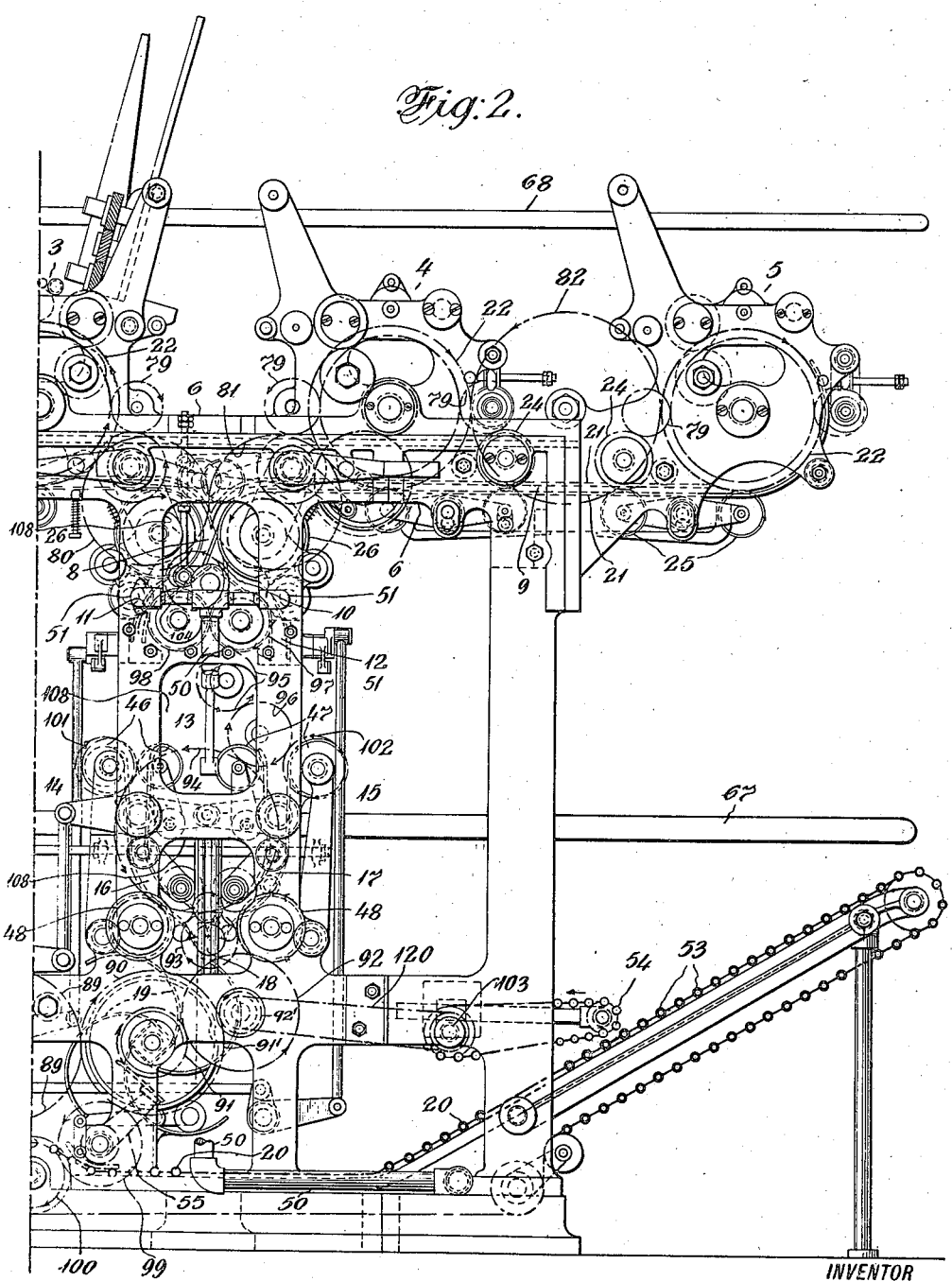

In the particular machine shown in Figs. 1 and 2 of the drawing, a group of feeding devices 1, 2, 3, 4 and 5 are shown arranged along the top of the frame-work 6 of the machine. The most centrally located feeding device 3 of the group is preferably utilized for the cover sections and the remaining ones for the sections which are to be used as insert sections. The particular construction of the feeding devices, which are each adapted to hold a pile of paper sections and to separate and feed them individually into the machine, will not be specifically described herein for the reason that their construction forms the subject matter of a separate application Serial No. 131672, filed Nov. 16, 1916. A passageway 7 formed by the guiding strips 21 forms a common path through which paper sections are conveyed from the feeding devices 1, 2 and 3 to a point intermediate the ends of the machine where both the passageway 7 and a second passageway 9 leading from the remaining feeding devices 4 and 5 are diverted downwardly and merge in a short vertical channel 8 in which a switch 10 operates to divert the moving paper sections to either the passage 11 or the passage 12 leading downwardly into the opening and inserting mechanism indicated generally at 13. This mechanism comprises the two opening devices 14 and 15 which operate in alternation to open the cover sections while inserts are deposited therein, and then discharge the assembled papers through the merging passages 16 and 17 to the common discharge chute 18 whence they drop into the S-type transferring device 19 to be deposited on the endless delivery conveyer 20.

As the paper sections are fed out from the piles held by the feeding devices, they pass directly from the peripheries of the cylinders 22 of the feeding devices into the passageways 7 or 9, along both of which they are propelled by the engagement therewith of the cylinders 22 and the feed rollers 24 both of which coöperate with spring pressed nip rolls 25 to grip the paper sections and carry them along the passageways toward the switch channel 8.

A curved guiding plate 35 at the junction of the two passageways 7 and 9 serves to divert the moving paper sections from their horizontal paths of travel into the switch channel 8 where, in the preferred method of operation, insert sections from the two passageways 7 and 9 are brought into associated relation and then diverted by the switch 10 through either the branch passage 11 or 12 to the corresponding opening device in which a cover section is being opened to receive them. In order to insure the movement of the paper sections through the curved channels through which the papers are diverted to the switch channel 8 by the curved plate 35, the feed rolls 26 are provided which coöperate with nip rolls 25 to feed the paper sections into the switch channel. The feed rolls 26 are preferably mounted in the frames 27 which are pivotally mounted on the supporting rods 28 to provide for swinging the feed rolls 26 out of their coöperative relation to the switch channel 10 to give access thereto, as will be hereinafter described. Additional feed rolls 31 also carried by the frames 27 coöperate with feed rolls 97 and 98 to propel the paper section through the branch passages 11 and 12 to the corresponding opening devices.

The two opening devices 14 and 15 to which reference has been made, are arranged to operate in alternation in order to provide for the feeding of inserts into one opened cover section while another cover section is being opened, and thus obviate any interruption in the regular progress of the paper sections through the machine. The operation of the switch 10 bears such a timed relation to the operation of the opening devices 14 and 15 as to control the feeding of paper sections thereto in exact accordance with their cycles of operation. In the normal operation cover sections are fed from the passageway 7, which connects with the cover feeding device 3, into the switch channel 8 in alternation with insert sections which are simultaneously fed from the opposite passageways 7 and 9 into an associated relation in the switch channel. In the timing of the parts the switch 10 is swung to the opposite side of the switch channel immediately following the passage of a cover section therethrough. The cover section is fed down through the branch passage 11 or 12 to the corresponding opening device which is at this point in the operation in its opened position. Meanwhile the following insert section, which was directed into the other branch passage is similarly fed downwardly into a cover section which has been opened to receive it. The passage of the insert section into place is followed by the feeding through the same branch passage of a cover section before the position of the switch is changed and this cover section drops into place between the opened jaws of the opening device immediately following the discharge of an assembled paper therefrom. The purpose of diverting each insert section into the passage other than that through which the preceding cover section has passed, is obviously to provide time for the cover section to pass downwardly into the corresponding opening device and be opened before an insert section is supplied to it. Each cycle of operation such as has been described takes place alternately in one or the other opening devices in accordance with each reversal of the switch 10, as will be obvious.

The particular construction of the opening devices carried by the jaw-like members shown in Fig. 4 of the drawing for closing against the sides of a folded paper section to seize and pull the folds to opened position, will not be specifically described in this application for the reason that application Serial No. 131673 having the construction of the opening devices for its subject matter, is being filed herewith. In general each of the two opening devices includes a pair of jaws 119 and 122 pivoted to swing on the supporting rods 114 and 115 to and from each other and an intermediate folded paper section as it is fed downwardly into place between them. It will be seen that by means of the operating rod 116 which bears a suitable timed relation to the operation of the switch 10, the opening devices 14 and 15 can be operated in accordance with the movements of the switch. The opening devices are operated in alternation as has been pointed out and the means for effecting this includes the arms 117 and 118 which are carried by the jaw 119 of the opening device 14. The arm 117 is connected to the operating rod 116 while the other arm 118 is connected to an arm 120 carried by the corresponding jaw 119 of the opening device 15. The jaw 119 of the opening device 14 is directly connected through the link 121 with the jaw 122 of the opening device 15 while the jaw 119 of the opening device 15 is directly connected to the jaw 122 of the opening device 14 through the link 123. It will be seen that by this construction the two opening devices are operated in unison and alternation, in that a movement of the operating rod 116 downwardly, for instance, to move the jaw 119 of the opening device 14 to closed position will, through the arms 118 and 120, move the jaw 119 of the opening device 15 to opened position. Also the links 121 and 123 will operate to move the jaw 122 of the opening device 14 to closed position and the jaw 122 of the opening device 15 to opened position, as will be obvious.

The means for discharging the assembled papers from the opening devices comprises the feed rolls 46 for the opening device 14 and the feed rolls 47 for the opening device 15. Either pair of rolls is constructed to be swung inwardly into engagement with the completely assembled paper section to feed it out into the channels 16 or 17 where the feed rolls 48 coöperate with the nip rolls 49 to eject the paper into the discharge chute 18. It will be noted in Fig. 2 that the feeding-out rolls 46 of the opening device 14 are in closed or operative position while the corresponding rolls 47 of the opening device 15 are in opened position. Obviously this condition is reversed in exact correspondence with the operation of the opening devices themselves.

In the paper handling arts in general it is well-known that machines designed to operate on this material have a tendency to become clogged whereupon it becomes necessary to stop the operation of the machine and remove the obstructing tangle of paper. Newspaper assembling machines are no exception to this general rule and it is evident that it is highly desirable to provide as simple a construction as possible with all working parts readily accessible. With this end in view the horizontal passageways through which the paper sections are fed into the machine are so mounted in relation to the open framework of the machine that the passageways can be easily reached from beneath. For the same reason the opening devices and the particular feeding mechanism which delivers paper sections thereto are arranged in a comparatively narrow vertical column so that all parts of the mechanism can be easily reached from either side. To facilitate this, the machine as a whole is so designed and constructed that ample space is provided between the opening mechanism and the end pieces of the machine framework to provide more ready access to the opening mechanism. Openings such as are shown at 108 in Figs. 2 and 3 of the drawing increase the accessibility of the parts referred to.

It will be seen that the downward course of the paper sections through the feeding mechanism and opening devices to the delivery mechanism at the base of the machine is comparatively direct and without substantial deviation. From the vertical switch channel to the paper sections are diverted through a curved branch passage 11 or 12 to either opening device and then back through the branch passage 16 or 17 to the discharge chute 18 which is arranged in exact vertical alinement with the switch channel 8. The only substantial divergence from their normal direction of travel which the paper sections are subjected to is at the ends of the passageways 7 and 9 where they are fed into the switch channel 8. The paper sections are more likely to become clogged at this particular point in their progress through the machine than at any other, not only because of their abrupt divergence from their horizontal path of travel, but also because of the bringing and associating together at this point of insert sections from both the passageways 7 and 9.

Figure 3:
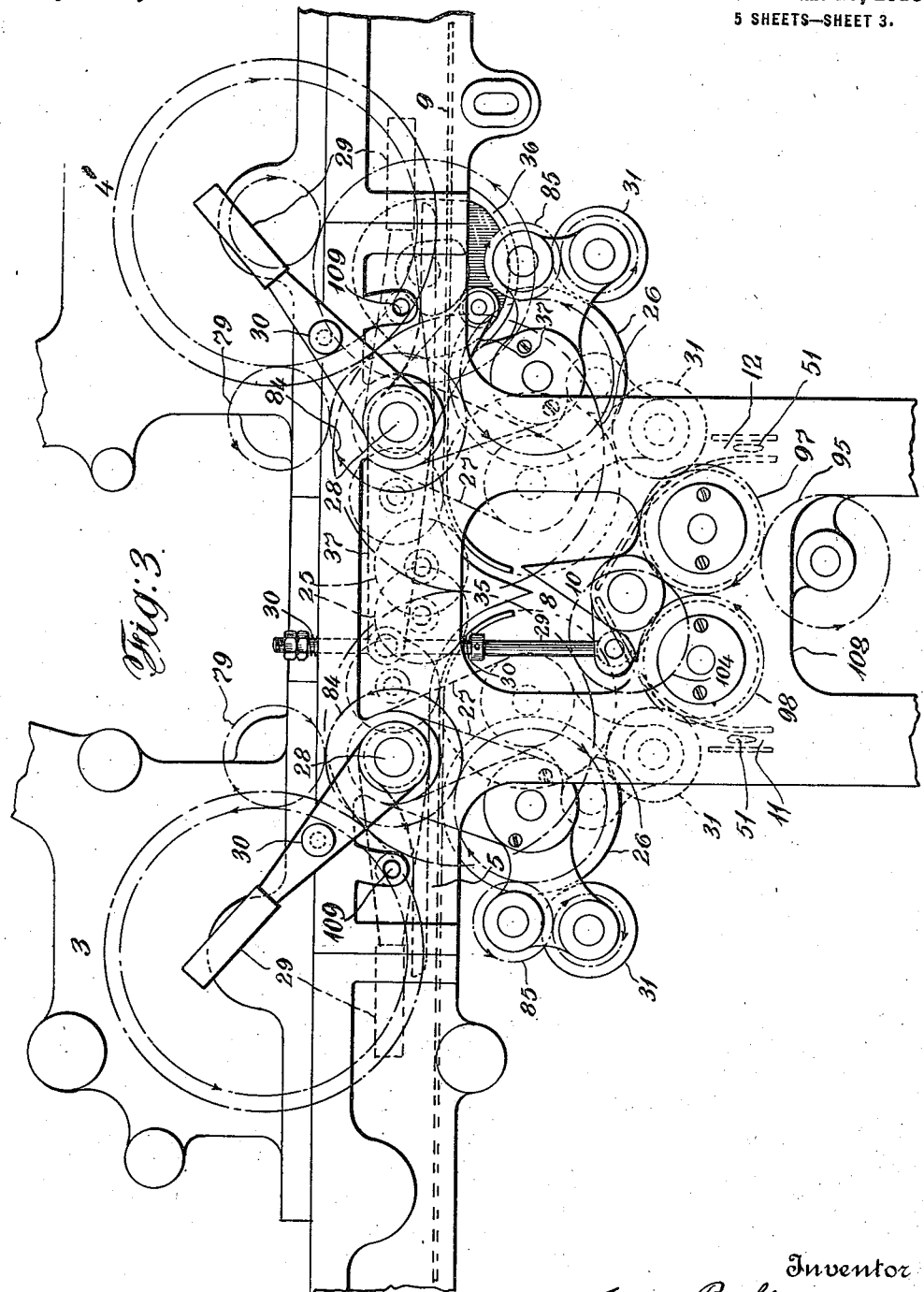
Fig. 3 is an enlarged detailed view of the devices used for moving the feed rollers out of operative position.

Special means have been provided for giving access to the switch channel and these means take the form of the movable mounting for the feed rollers 26 and 31 which have already been generally referred to. This particular construction is best shown in Fig. 3 of the drawing and it will be seen that the frames 27 which carry the feed rolls can be swung bodily about their pivots 28 by means of the hand levers 29. Spring catches 30 which are adapted to project into the holes 109 in the framework serve to latch the hand levers 29 and, hence, the feed rolls 26 and 31 in operative position. The catches 30 can be manually withdrawn from their seats to release the hand levers 29 which may then be utilized to swing the feed rolls clear from the switch channel 8 which then may be easily reached for the purpose of removing clogged material therefrom. The normal or operative position of the parts is shown in dotted lines in Fig. 3 of the drawing and in full lines in Fig. 2, while the open position of the feed rolls is shown in full lines in Fig. 3.

In the preliminary assembling, or associating, of the insert sections which takes place before the insert sections are fed into the cover sections, the speed of operation of the feeding devices 1, 2, 3, 4 and 5, and of the feed rollers 24, bears such a relation to the distances the feeding devices are spaced from each other and from the switch channel 8, that in the normal operation, insert sections fed into the passageways 7 and 9 will arrive at the feeding devices 2 and 4, respectively, just as insert sections are emerging therefrom. The insert sections from the feeding devices 2 and 4 are accordingly deposited on the sections from the feeders 1 and 5, so that double insert sections traverse the passageways 7 and 9 from the feeders 2 and 4 to the switch channel 8. This preliminary doubling, or assembling, of the sections takes place with all the insert sections delivered after the initial operation when, of course, no insert sections from the feeders 1 and 5 would be in place to join with sections emerging from the feeders 2 and 4. The travel of the assembled sections after leaving the feeders 2 and 4 is also so timed that sections from both the passageways 7 and 9 arrive simultaneously at the switch channel 8 where they are joined into groups of four sections before being inserted into the open cover sections below. The timing of the cover section feeding device 3 is such that the sections therefrom are delivered into the passageway 7 between double insert sections from the feeder 2 so that cover sections pass into the switch channel 8 alternately with insert section groups.

In addition to the means provided for securing access to obstructed parts of the machine, means are also provided for automatically stopping the operation of the machine when more than the normal number of paper sections are fed into the passageways 7 or 9. This means will be only briefly described in this case since this construction forms the subject matter of a separate application Serial No. 131675, filed Nov. 16, 1916. A rock shaft 110 extending parallel to the passageways 7 and 9 is provided at the left-hand end of Fig. 5 with an arm 111 adapted, when the shaft 110 is rocked, to engage and operate the circuit breaker shown at 112. Means for operating the rock shaft to open the circuit breaker and cut off current to the motor 70 comprises arms 113 attached to the spring pressed nip roll carrying arms 114′. The arms 113 are adapted when an abnormally thick mass of material, such as would be provided by more than the normal paper section supply passes the corresponding nip roll, to be rocked by the downward movement of the nip roll into position to engage and turn one of the bell cranks 115′ about its pivot into engagement with one of the arms 116′ on the shaft 110 to thereby rock the shaft and operate the circuit breaker.

Located adjacent the feeding device 3 is another form of rock shaft opertaing device which takes the form of a rod 117′ yieldingly mounted in engagement with the underside of the guide strips 21. The downward deflection of the guide strips due to an unduly thick mass of material passing thereover, would move the rod 117′ downwardly and thus pull the rod 118′ to rock the shaft 110 through the engagement of the rod 118′ and an arm 119′ projecting laterally from the rod 110.

It will be seen that a simple form of delivery mechanism has been provided. The S-type rotary transferring device 19 rotates about the axis 52 so placed that the arms of the device receive the assembled papers from the discharge chute 18 and deposit them on the horizontal stretch of the delivery conveyer which extends underneath the transferring device. The delivery conveyer is given an upward inclination as at 53 as it emerges from the framework of the machine to carry the papers to a suitable height for final delivery. In order to correct any tendency which the papers might have to slide backwardly down the inclined portion 53 of the delivery conveyer, a supplemental conveyer 54 is provided which is adjustably mounted on the cross bar 103 with one end so located as to engage the papers passing up the inclined path. The supplemental conveyer is preferably driven through a sprocket chain 120 from a sprocket on the gear 92 and it will be seen that the progress of the paper up the incline will be assisted by the action of this conveyer. The main delivery conveyer 20 is preferably driven through an intermediate gear 99 which meshes with the gear 90 on the shaft 52 and with a gear carried by the sprocket 100.

Coöperating with the rotatable transferring device 19 is a suitable counting device indicated generally at 55. This counting device operates to push an assembled paper diagonally out of its normal position so that it will take a position on the delivery conveyer out of alinement with the remaining papers to thereby mark the limits of a predetermined number of papers in a well-known manner.

A platform 67 is preferably provided at the rear of the machine on which workmen can stand to fill the hoppers of the feeding devices at the top of the machine. A shelf or table 68 adjacent the hoppers is provided on which the papers can be deposited or arranged preliminary to their being placed in the hoppers of the feeding devices. It will be obvious that either one or both of the hoppers at 1 and 2, or 4 and 5, can be utilized as needed.

Any suitable driving mechanism may be utilized in the operation of the device. Preferably a motor indicated generally at 70 is employed. A pinion 71 carried by the motor shaft drives a gear 72 which conveys motion through a pinion 73 to the intermediate gear 74 which meshes with the feeder and the assembling mechanism drive gear 75 and the delivery mechanism drive gear 76.

The drive gear 75 meshes directly with an intermediate gear 77 which meshes with gears on the main feeder members 22 of the adjoining feeding devices 2 and 3. A second intermediate gear 78 conveys motion to the member 22 of the feeding device 1 from the member 22 of the feeding device 2 as is clearly shown. Each of the feed rollers 24 coöperating with the passageways 7 and 9 is driven through an intermediate pinion 79 from the adjacent feeder member 22.

In order to convey motion to the mechanism of the feeding devices 4 and 5 which of necessity must operate in reverse to the feeding devices 1, 2 and 3, instead of conveying motion from the feeding device 3 to the feeding device 4 through a single intermediate gear such as 77 or 78, a pair of gears 80 and 81 are made use of. These gears intermesh and operatively connect the feeder members 22 of the feeding devices 3 and 4. An intermediate gear 82 serves to drive the feeder member 22 of the feeding device 5 from the corresponding member of the feeding device 4.

The movably mounted feed rolls 26 and 31 are each preferably driven through a train of gearing comprising the pinion 79 meshing with a gear on the corresponding feeder member 22 of the feeding device 3 or 4. The pinion 79 meshes in turn with an intermediate gear 84 turning on the shaft 28 which meshes in turn with a gear on the feed roll 26. An intermediate pinion 85 drives the feed roll 31 from the feed roll 26.

Preferably the switch 10 is operated from a cam 36 driven from a pinion on the main shaft of feeding device 4, as shown in Fig. 3. The arm 37 pivoted at 28, conveys motion from the cam 36 to the switch operating rod 29 through the springs 30.

The gear 80 preferably also meshes with an intermediate gear 104 which operates to drive a gear connected to the feed roller 97 and from which the feed roll 98 is driven. A pair of intermeshing gears 95 and 96 transmit motion from the gear on the feed roller 97 to the large gear 94 and the gear 102 which drives the outermost of the feeding out rollers 47 of the opening device 15. The gear 94 meshes also with a gear 101 from which is driven the outermost feeding-out gear 46 of the opening device 14. An intermediate gear 93 driven from the gear 94 serves to drive the feed roller 48 beneath the opening device 15 while the remaining feed roller 48 of the opening device 14 is driven from a gear connection directly with the gear 94.

The remaining main drive gear 76 which drives the delivery mechanism carries a pinion 86 meshing with a gear 87 which in turn carries a pinion 88 meshing with a gear 89. The gear 89 transmits motion to a gear 90 mounted on the shaft 52 which carries the transferring device 19, and from which the delivery mechanism is driven in the manner already described. A pinion 91 on the same shaft 52 meshes with a gear 92 which carries a pinion 92' meshing with a gear 91' to drive the counting mechanism 55.

What is claimed, is:

1. An assembling machine comprising: insert section feeding devices located adjacent each end thereof, a cover section feeding device and an assembling mechanism located intermediate the ends of the machine, and means for feeding a section from the cover section feeding device to the assembling mechanism with each cycle of operation together with a section from the insert section feeding devices adjacent the ends of the machine in alternation.

2. An assembling machine comprising: a pair of assembling devices, a passage through which folded paper cover sections and insert sections are caused to pass in alternation, branch passages leading from said passage to said assembling devices, a switch for diverting paper sections to one or the other branch passage, and means for operating the switch following the passage of each cover section, whereby an insert section and a cover section pass through each branch passage in succession and in the order named.

3. An assembling machine comprising: a plurality of insert section feeding devices located at each end of the machine, a cover section feeding device and an assembling mechanism located intermediate the ends of the machine, and means for feeding a section from the cover section feeding device to the assembling mechanism with each cycle of operation together with a section from the group of insert section feeding devices at each end of the machine in alternation.

4. An assembling machine comprising: a series of feeding devices arranged in horizontal alinement, a passageway connecting said feeding devices and into which said folded paper sections are fed from said feeding devices, means for propelling paper sections along the passageway from the ends thereof to an outlet intermediate said ends, the speed of operation of the feeding devices and propelling means being such that sections from the different feeding devices are assembled as they approach the outlet, and sections arriving at the outlet from opposite ends of the passageway are additionally assembled at the outlet.

5. An assembling machine comprising: a series of feeding devices arranged in horizontal alinement, a passageway connecting said feeding devices and into which said folded paper sections are fed from said feeding devices, means for propelling paper sections along the passageway from the ends thereof to an outlet intermediate said ends, the speed of operation of the feeding devices and propelling means being such that sections from the different feeding devices are assembled as they approach the outlet, and sections arriving at the outlet from opposite ends of the passageway are additionally assembled at the outlet, and means for inserting the assembled sections into a cover section.

6. An assembling machine comprising: a plurality of feeding devices mounted in the upper part of the machine, a common downwardly extending channel through which paper sections from the several feeding devices are fed, a pair of assembling devices arranged to receive paper sections from said downwardly extending channel, and a common downwardly extending discharge chute located beneath the assembling devices for delivering assembled papers therefrom.

7. A paper assembling machine comprising: a plurality of paper section feeding devices mounted in horizontal alinement in the upper part of the machine, passageways leading from each end of the machine to a downwardly extending passage intermediate the ends of the machine, said feeding devices being arranged to feed paper sections directly into said passageways, means for conveying the papers through said passageways from opposite directions to said downwardly extending passage, a pair of assembling devices below said passage and means for diverting paper sections as they emerge from said passage to one or the other assembling device.

8. A paper assembling machine comprising: a plurality of paper section feeding devices mounted along the top of said machine, each of said feeding devices including a rotatable feeding-out member, a passageway connecting the feeding devices and bearing a tangential relation to the rotatable feeding-out members whereby folded paper sections are fed directly from the peripheries of said feeding-out members into said passageway, means for conveying the paper sections along said passageway, and assembling mechanism supplied from said passageway.

9. A paper assembling machine comprising: an open framework, a plurality of paper section feeding devices mounted along the top of said framework, each of said feeding devices including rotatable feeding-out members, and a passageway in the upper part of said machine connecting the feeding devices and bearing a tangential relation to the rotatable feeding-out members whereby folded paper sections are fed directly from the peripheries of said feeding-out members into said passageway, said feeding devices and said passageway being readily accessible from the exterior of the machine and through said open framework.

10. A paper assembling machine comprising: an open framework, a plurality of paper section feeding devices mounted along the top of said framework, each of said feeding devices including a rotatable feeding-out member, a passageway in the upper part of said machine connecting the feeding devices and bearing a tangential relation to the rotatable feeding-out members whereby folded paper sections are fed directly from the peripheries of said feeding-out members into said passageway, means for conveying the papers along said passageway, and assembling mechanism supplied from said passageway, said feeding devices, said passageway, and said assembling mechanism being readily accessible from the exterior of said machine and through said open framework.

11. A paper assembling machine comprising: a plurality of paper section feeding devices mounted in horizontal alinement in the upper part of the machine, a passageway connecting the feeding devices and into which paper sections are fed directly from said feeding devices, means for conveying the papers through said passageway, a pair of assembling devices, a downwardly extending passage leading from the end of said passageway through which the folded paper sections pass to said assembling devices located one on either side of the axis of said downwardly extending passage, and a discharge chute beneath said assembling devices in axial alinement with the downwardly extending passage.

12. A paper assembling machine comprising: a plurality of paper section feeding devices mounted in horizontal alinement in the upper part of the machine, a passageway connecting the feeding devices and into which paper sections are fed directly from said feeding devices, feed rollers for conveying the papers through said passageway, a downwardly extending passage leading from the end of said passageway, a switch in said passage, a pair of assembling devices located below said passage closely adjacent and one on either side of the axis of said passage, a branch from said passage to each assembling device, a discharge chute beneath said assembling devices in axial alinement with the downwardly extending passage, and a branch passage extending from each assembling device to said discharge chute.

13. An assembling machine for folded paper sections comprising: feeding means, a straight-line passageway leading from said feeding means and into which paper sections are fed, assembling mechanism through which the sections are fed in a direction at an angle to said passageway, a curved passage leading from said passageway into said assembling mechanism, a feed roller adjacent said curved passage for feeding paper sections therethrough, and means for moving said feed roller away from said curved passage to provide access thereto.

14. An assembling machine for folded paper sections comprising: a plurality of horizontally alined feeding devices, a passageway connecting said feeding devices and into which paper sections are fed, curved passages merging into a single vertical channel intermediate the ends of said passageway for diverting the paper sections downwardly, assembling mechanism beneath said vertical channel, feed rollers arranged to feed paper sections through said channel into said assembling mechanism, and means for moving one or both of said rollers away from said channel to provide access thereto.

15. An assembling machine comprising: a framework, feeding devices mounted in the upper part of the framework, a passageway connecting said feeding devices, assembling mechanism mounted in the framework beneath said feeding devices, means including a roller for transferring paper sections from said passageway to said assembling mechanism, means for moving said roller out of operative position, said assembling and said transferring mechanism having a compact arrangement whereby unobstructed spaces of substantial size are provided between said mechanism and the opposite ends of the framework, and openings in the sides of said framework through which a workman can enter to have access to said transferring mechanism to move said roller out of operative position.

16. An assembling machine for folded paper sections comprising: a framework, feeding devices mounted in the upper part of the framework, a passageway connecting said feeding devices, assembling mechanism mounted in the framework beneath the feeding devices, feed rollers, a channel through which paper sections are transferred by said rollers from said passageway to said assembling mechanism, and means for moving said rollers away from said channel to provide access thereto.

17. An assembling machine comprising: a framework, feeding devices mounted in the upper part of the framework, a passageway connecting said feeding devices, a pair of assembling devices mounted in the framework beneath said feeding devices, means including propelling rollers and an interposed switch for transferring paper sections from said passageway to said assembling devices, and means for moving the rollers out of operative relation to said switch to provide access thereto.

18. An assembling machine comprising: a framework, feeding devices mounted in the upper part of the framework, a passageway connecting said feeding devices, a pair of assembling devices mounted in the framework beneath said feeding devices, means including propelling rollers and an interposed switch for transferring paper sections from said passageway to said assembling devices, means for moving the rollers out of operative relation to the switch to provide access thereto, said assembling devices and said transferring mechanism having a compact arrangement whereby unobstructed spaces of substantial size are provided between said mechanism and the opposite ends of the machine framework, and openings in the sides of said framework through which a workman can enter to have access to said switch.

19. An assembling machine for folded paper sections comprising: a pair of assembling devices, a passage for said paper sections having branches leading to said assembling devices, a switch in said passage for directing the paper sections through one or the other branch passage to the corresponding assembling device, a feed roller operatively associated with said switch for propelling paper sections into one of the branch passages, and means for moving said feed roller away from said switch to provide access thereto.

20. An assembling machine for folded paper sections comprising: a pair of assembling devices, a passage for said paper sections having branches leading to said assembling devices, a switch in said passage for directing the paper sections through one or the other branch passage to the corresponding assembling device, feed rollers mounted one on either side of said switch for propelling paper sections through said switch passage, and means for moving said feed rollers away from said switch passage to provide access to said switch.

21. An assembling machine comprising: a pair of assembling devices, means for feeding cover sections and insert sections to said assembling devices, a passage connecting said feeding means and said assembling devices, a switch in said passage, means for operating said switch to direct a cover section and an insert section to the assembling devices in alternation, and means for operating the assembling devices in alternation in accordance with the movements of the switch.

22. An assembling machine comprising: a passageway through which paper sections are fed into the machine, means for feeding paper sections into said passageway, means for conveying the paper sections through said passageway, means for stopping the operation of the machine when an abnormal number of paper sections have been fed into said passageway, and means for moving the conveying means away from said passageway to provide access thereto for the removal of the abnormal number of sections.

23. An assembling machine comprising: a passage through which paper sections are fed into the machine, means for feeding paper sections into said passage, means for conveying the paper sections through said passage, a pair of assembling devices to which paper sections are delivered from said passage, a switch for directing said paper sections to one or the other of said assembling devices, means for automatically stopping the operation of the machine when an abnormal number of paper sections which would tend to become clogged at the switch are fed into said passage, feeding rollers associated with said switch to deliver paper sections into said assembling devices, and means for moving the feeding rollers out of their associated relation with said switch to provide access thereto for the removal of the abnormal number of sections.

24. An assembling machine for folded paper sections comprising: a framework, a horizontal passageway in the upper part of the framework, a plurality of feeding devices arranged to deliver paper sections into said passageway, assembling mechanism for said paper sections mounted in said framework, a vertical channel leading from said horizontal passageway through which paper sections pass to said assembling mechanism, feed rollers at the point of junction of said horizontal passageway and said vertical channel, and means for moving said rollers away from said point of junction to provide access thereto.

25. An assembling machine for folded paper sections comprising: a framework, a horizontal passageway in the upper part of the framework, a plurality of feeding devices arranged to deliver paper sections into said passageway, a pair of assembling devices for said paper sections in said framework, a pair of feed passages for said assembling devices, said passages merging into a single vertical channel leading from said horizontal passageway, feed rollers at the point of junction of said channel and said passageway, and means for moving said rollers away from said point of junction to provide access thereto.

26. An assembling machine comprising: a horizontal passageway, a plurality of devices for feeding paper sections into said passageway, assembling mechanism, a channel leading from said passageway for supplying said assembling mechanism with paper sections, means for conveying paper sections through said channel into said assembling mechanism, means for stopping the operation of the machine when an abnormal number of paper sections has been fed into said passageway, and means for moving the conveying means away from said channel to provide access thereto for the removal of the abnormal number of sections that have been delivered thereto from said passageway.

27. An assembling mechanism for folded paper sections comprising: a framework, a horizontal passageway in the upper part of the framework, a plurality of feeding devices arranged to deliver paper sections into said passageway, assembling mechanism for said paper sections mounted in said framework, a vertical channel leading from said horizontal passageway through which paper sections pass to said assembling mechanism, means for stopping the operation of the machine when an abnormal number of paper sections has been fed into said passageway, feed rollers at the point of junction of said horizontal passageway and said vertical channel, and means for moving said rollers away from said point of junction to provide access thereto for the removal of the abnormal number of sections that have been delivered thereto from said passageway.

28. An assembling mechanism for folded paper sections comprising: a framework, a horizontal passageway in the upper part of the framework, a plurality of feeding devices arranged to deliver paper sections into said passageway, a pair of assembling devices for said paper sections in said framework, a pair of feed passages for said assembling devices, said passages merging into a single vertical channel leading from said horizontal passageway, means for stopping the operation of the machine when an abnormal number of paper sections has been fed into said passageway, feed rollers at the point of junction of said horizontal passageway and said vertical channel, and means for moving said rollers away from said point of junction to provide access thereto for the removal of the abnormal number of sections that have been delivered thereto from said passageway.

Signed at New York in the county of New York and State of New York this 13th day of November A. D. 1916.

WARD B. STORY.